Patented Mar. 10, 1942

2,275,969

UNITED STATES PATENT OFFICE 2,275,969

STEROL-LIKE PREPARATION

August Julius Helmuth Kongsted, Copenhagen, Denmark

No Drawing. Application December 8, 1937, Serial No. 178,811. In Great Britain December 12, 1936

3 Claims. (Cl. 260—210)

This invention relates to a process of preparation of glucoside-like condensation products from compounds having a sterol-like carbon skeleton and phenol- or alcohol-hydroxyl substituents.

These compounds are known and have a skeleton consisting of a perhydrocyclopentane-phenanthrene ring system. In this ring system there may be one or more double bonds and also one or more of the six-link rings may be benzene rings. Furthermore, at one or more places, especially at the tertiary bound carbon atoms methyl groups may be connected therewith. Such a skeleton may thus have the following composition, the entirely saturated ring system being taken by way of example:

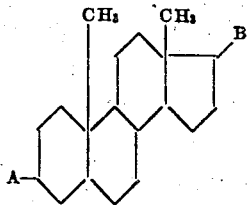

Where A and B represent either hydroxyl or carbonyl groups.

The substances having this skeleton which are to be treated by this process are dihydroxy- or hydroxy-keto or acyl-hydroxy compounds. If the ring in which A is hydroxyl is a benzene ring, the compounds have the nature of a phenol, and if B is keto, of a ketone compound.

Examples of these substances are the sex-hormones and synthetic substances having closely resembling composition and similar properties which are for shortness' sake termed sex-hormones in the following. Examples are oestrone, having a phenol group A and a ketone group B; dihydro-oestrone, where both A and B are hydroxyl; and acyldihydro-oestrone, where A is an acyl group and B, hydroxyl.

Also the male sex-hormones, such as androsterone and dehydro-androsterone, which has an alcohol group at A and a ketone group at B; and testosterone which has a ketone group at A and an alcohol group at B.

These compounds are medicines, usually administered parenterally, because they have a much smaller effect when administered perorally.

The principal object of this invention is a process by which these compounds may be so modified as to increase their effect when administered orally and the product of this process.

Another object of this invention is a process of condensing these compounds with other compounds to produce medicines which have greatly increased effect when administered perorally over that of the original substances.

The invention accordingly comprises the several steps and the relation of one or more of such steps with respect to each of the others, and the products possessing the features, properties, and the relation of constituents, which are exemplified in the following detailed disclosure, and the scope of the invention will be indicated in the claims.

The present invention concerns a method in which compounds of the above kind, i. e. compounds with a sterol-like carbon-skeleton and containing phenol or alcohol hydroxyl may be converted into derivatives the effect of which when administered perorally is substantially increased in comparison with the prime materials. This method consists in condensing the compound in connection with or after its preparation or recovery with polyhydroxyketones or polyhydroxyaldehydes, which compounds constitute the class of monosaccharoses, (see Organic Chemistry, Whittmore, p. 549,) particularly carbo-hydrates or derivatives thereof. Thereby a kind of glucoside-like condensation product is formed—if necessary, with the aid of appropriate condensation accelerators—the polyhydroxyketone or aldehyde reacting with the alcohol or phenol group of the compound.

It is known per se that synthetic glucosides of this type can be formed by bringing a monosaccharide to reaction with an alcohol or a phenol in the presence of hydrochloric acid, the reaction taking place in accordance with the following equation:

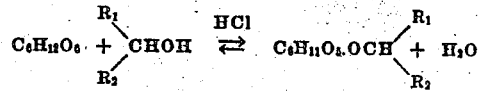

where $R_1$ and $R_2$ are alkyl groups, for example.

Equally it is known that in such syntheses particularly acylated carbo-hydrates may be used with particular advantage, e. g. penta-acetylglucose in the presence of suitable catalysts or halogen derivatives of acylated polyhydroxyaldehydes or polyhydroxyketones, e. g. aceto-brom-glucose.

On the contrary it is not known that such and like reactions also can be used for introducing polyhydroxyketones or polyhydroxyaldehydes or derivatives thereof in such substances as the sterol-like compounds, which belong to the cholane series above indicated, and that thereby the before mentioned therapeutic effect can be obtained.

Like the aforementioned known processes, the process of this invention may advantageously be carried out by using penta-acetylglucose and other polyacyl derivatives of carbo-hydrates, the reactions being brought about by using, if necessary, condensation accelerators which may be toluene-sulphonic acid and other catalysts, well known as such accelerators. The process may also be carried out with the use of a halogen derivative of an acylated carbo-hydrate, as known from the aforementioned use of aceto-bromglucose. In case of the last-mentioned reaction the presence of a substance able to bind the hydrogen halide produced, e. g. silver oxide, silver carbonate, mercurous acetate or any suitable base is appropriate and also a catalyst may be present. Suitable catalysts are well known and a list of such is to be found in Methoden der Organischen Chemnie by Houben, third edition, 1930, vol. 3, page 134.

The invention includes equally the new medicines themselves, obtained by the process disclosed, which consist of glucoside-like condensation products of dihydroxy-compounds or hydroxy-oxo-compounds of the aforementioned kind with polyhydroxyketones or polyhydroxyaldehydes or derivatives thereof.

The process will be elucidated by means of the following examples.

Example 1

15 g. of oestrone and 45 g. of aceto-brom-glucose together with 28 g. of freshly precipitated dried silver oxide are dissolved or dispersed in 150 cc. of quinoline and the mixture left at room temperature during 4 hours. During the reaction a slight development of heat occurs and the mixture becomes constantly thicker. Thereafter 1500 cc. of chloroform are added and after shaking, the mixture subjected to centrifugal action. The chloroform is washed several times with dilute sulphuric acid and N/1 sodium hydroxide. After recrystallization in 96% ethyl alcohol the product forms beautiful crystals with melting point about 210° C. which possibly will be altered somewhat, however, on further recrystallization.

The product is tetra-acetyl-glucoside of oestrone and when administered perorally, shows a considerably higher therapeutic activity than the oestrone itself.

For instance with oestrone an activity of about 75000 M. U. per gram could be found when the substance was administered perorally to the mice by means of a sound, 5 peroral doses in 48 hours. On the other hand the tetra-acetyl-glucoside of oestrone prepared in the above described manner shows under the same circumstances an activity of 125000 M. U. per gram corresponding to an increase of activity of about 3.5 times, as the glucoside contains about 45% oestrone.

Example 2

Equimolar amounts of oestrone and aceto-brom-glucose are dissolved in benzene, an amount of mercuric acetate a little less than the equivalent amount necessary to combine with the bromine being added. After 2 hours heating with the exclusion of moisture the benzene layer is separated and washed with water and sodium hydroxide. Thereupon the benzene solution is dried and the benzene is distilled off in vacuum. The distillation residue is recrystallized in ethyl alcohol. Though this process gives good yields with oestrone, it is in contradistinction to the process described in Example 1, especially suitable for the treatment of compounds in which the group with which the condensation is accomplished, is an alcohol group, e. g. the male sex-hormones.

Example 3

A mixture of 2 g. of oestrone, 4 g. of penta-acetyl-glucose and 0.1 g. of toluene-sulphonic acid is heated to about 125° and kept at this temperature during 1 hour under vigorous agitation. The mass is taken up in 150 cc. benzene. The benzene solution is washed several times with water and dilute sodium hydroxide. The benzene is dried over calcium chloride and distilled off in vacuum. The evaporation residue gives after recrystallization in 96% alcohol crystals with a melting point of about 210° C. which possibly will be altered on repeated recrystallization, however.

Example 4

2.50 g. of dihydro-oestrone and 7.5 g. of aceto-brom glucose are dissolved in 40 cc. quinoline. The solution is supplied with 4.7 g. of freshly precipitated dry silver oxide and the mixture is allowed to stand during about 4 hours. After this time during which the mixture has constantly increased in viscosity, it is taken up in 250 cc. of chloroform. After centrifugalization the chloroform-solution is washed with dilute sulphuric acid and water and then the chloroform is evaporated in vacuum.

Generally speaking the processes disclosed in the examples and similar processes are not only suitable for the treatment of oestrone, dihydro-oestrone and male sex-hormones, but also for the treatment of other compounds of the composition indicated in the introduction. The process described may also be applied in cases where the polyhydroxy-compound is other than glucose and also in this case the process is preferably carried out in such a manner that the compound is condensed with a polyacyl-compound.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween; and that they are intended to be inclusive in scope and not exclusive, in that if desired other materials may be added to my novel composition of matter herein claimed without departing from the spirit of the invention. Particularly it is to be understood that in said claims ingredients or components recited in the singular are intended to include compatible mixtures of said ingredients wherever the sense permits.

I claim:

1. The process of preparing oestrone for peroral administration which comprises preparing a mixture of said oestrone and aceto-brom-glucose, dissolving said mixture in quinoline, adding silver oxide thereto and permitting the mixture to remain at rest, until the resulting reaction is completed, whereby an aceto-glucoside of oestrone is produced separating said substance from the solution and purifying said aceto-glycoside.

2. The process of preparing a sex hormone for oral administration which comprises dissolving in quinoline a sex hormone, selected from a class consisting of oestrone and dihydro-oestrone, and an acylated monosaccharose, the acyl groups thereof being of the lower fatty acid series, thereby producing an acylated glucoside-like condensation product of said hormone, separating said product from said solution and purifying said product.

3. The process of preparing a sex hormone for oral administration which comprises dissolving in quinoline a sex hormone, selected from a class consisting of oestrone and dihydro-oestrone, and an acylated and halogenated monosaccharose, the acyl groups thereof being of the lower fatty acid series, adding sufficient silver oxide to react with the halogen present, thereby producing an acylated glycoside-like condensation product of said hormone, separating said product from said solution and purifying said product.

AUGUST JULIUS HELMUTH KONGSTED.